United States Patent [19]
Groenendaal, Jr. et al.

[11] Patent Number: 5,222,862
[45] Date of Patent: Jun. 29, 1993

[54] TURBINE GENERATOR PRESSURE RELIEF DIAPHRAGM

[75] Inventors: John C. Groenendaal, Jr.; Kuo P. Huang, both of Winter Springs, Fla.

[73] Assignee: Westinghouse Electric Corp., Pittsburgh, Pa.

[21] Appl. No.: 923,285

[22] Filed: Jul. 31, 1992

[51] Int. Cl.⁵ ............................................. F01D 25/24
[52] U.S. Cl. ...................................... 415/9; 415/201; 137/68.1
[58] Field of Search ................... 415/9, 26, 27, 201; 137/68.1

[56] References Cited

U.S. PATENT DOCUMENTS

| | | | |
|---|---|---|---|
| 3,060,706 | 10/1962 | Hess | 415/9 |
| 3,698,598 | 10/1972 | Wood et al. | 137/68.1 |
| 3,945,760 | 3/1976 | Miller | 415/201 |
| 4,207,913 | 6/1980 | Fike, Jr. | 137/68.1 |
| 4,232,513 | 11/1980 | Pearson et al. | 60/39.091 |
| 4,479,587 | 10/1984 | Mundt et al. | 137/68.1 |

*Primary Examiner*—Edward K. Look
*Assistant Examiner*—James A. Larson
*Attorney, Agent, or Firm*—Peyton C. Watkins; J. C. Spadacene

[57] ABSTRACT

A pressure relief diaphragm is associated with a turbine housing and is operable to relieve excessive pressure within the turbine housing to prevent damage to turbine blades. The pressure relief diaphragm includes a safety housing having a mounting flange thereon arranged to mate with a turbine flange so that the safety housing is positioned over a relief opening in the turbine housing. A first solid, frangible solid disc covers the relief opening in the turbine housing and has a peripheral portion interposed between the mounting flange on the safety housing and the turbine flange. A second solid disc is positioned in the relief opening in the turbine flange in abutting contact with the first solid disc. A first plurality of bolts secures the mounting flange on the safety housing to the turbine flange. Spring washers associated with the first plurality of bolts maintain the positional relationship between the safety housing and the turbine flange. An annular ring is positioned on the first solid disc and above the relief opening in the turbine housing. A second plurality of bolts secures the second solid disc and the annular ring to the first solid disc. Spring washers associated with the second plurality of bolts maintains the positional relationship among the first solid disc, the second solid disc and the annular ring.

12 Claims, 4 Drawing Sheets

TURBINE GENERATOR PRESSURE RELIEF DIAPHRAGM

BACKGROUND OF THE INVENTION

1. Field of the Invention

The present invention relates generally to a turbine generator and, more particularly, is directed to a pressure relief diaphragm mounted on a turbine generator and having a construction which prevents air leakage into the turbine during turbine operation.

2. Description of the Prior Art

As well known in the art, a turbine generator includes a turbine housing enclosing a plurality of rows of turbine blades mounted on a common shaft. Pressurized steam forced into the housing and between the turbine blades causes the blades and shaft to rotate. The shaft is connected to a generator operable to convert the mechanical energy created as the shaft rotates to electrical energy. A turbine pressure relief diaphragm communicating with a relief opening in the turbine housing is operable to release excess pressure within the turbine housing generated during turbine operation.

The turbine pressure relief diaphragm itself includes a bird cage-shaped safety housing positioned over the relief opening in the turbine housing. The safety housing includes a mounting flange for receiving bolts which secure the safety housing to a mating flange on the turbine housing and surrounding the relief opening. The pressure relief diaphragm also includes a circular plate assembly which covers the relief opening. The circular plate assembly is formed from a smaller outside diameter plate member secured via a circular pattern of bolts to a larger outside diameter, annular lead ring. Upon assembly, the lead ring is disposed between the safety housing mounting flange and the mating flange on the turbine housing which surrounds the relief opening, and the plate member is positioned within the relief opening. The plate assembly is held in fixed position over the relief opening by the same bolts which secure the safety housing to the turbine housing since these bolts also pass through the lead ring.

During normal operation, the interior of the turbine housing is under vacuum and the exterior of the housing is at atmospheric pressure. The circular plate assembly seals the relief opening in the turbine housing to prevent steam from leaking out of the housing. If excess pressure is generated within the interior of the housing, the pressure relief diaphragm plate assembly shears along an arc located where the outside diameter of the plate member abuts the annular lead ring. The plate member and a portion of the lead ring are forced upwardly into the bird cage-shaped housing. When the plate assembly shears, the interior of the turbine housing is exposed to atmospheric pressure, allowing the excess pressure within the housing to vent to the atmosphere.

Even though the turbine pressure relief diaphragm known and used today functions in a satisfactory manner, the construction of the circular plate assembly may allow air to leak into the turbine housing during turbine generator operation. Over time, this air leakage may result in turbine blade stress corrosion cracking and corrosion fatigue.

Consequently, a need exists for a steam turbine which includes an improved pressure relief diaphragm having a construction which reduces the possibility of air leakage into the interior of the turbine during operation.

SUMMARY OF THE INVENTION

The present invention is directed to a steam turbine having a pressure relief diaphragm designed to satisfy the aforementioned needs. Particularly, the present invention is directed to a steam turbine comprising: (a) a turbine housing operable to receive steam and having a relief opening therein surrounded by a turbine flange; (b) a shaft positioned within said housing; (c) a plurality of rows of blades positioned along the longitudinal length of the shaft and extending radially out-wardly therefrom; (d) a steam inlet pipe connected with the housing and operable as a conduit to allow the steam entering the housing to pass between the plurality of rows of blades to rotate the shaft; and (e) a pressure relief diaphragm associated with the turbine housing and operable to relieve excess pressure within the turbine housing.

The pressure relief diaphragm itself includes:

i) a safety housing having a mounting flange thereon arranged to mate with the turbine flange so that the safety housing is positioned over the relief opening in the turbine housing upon assembly; ii) a first solid, frangible disc covering the relief opening in the turbine housing and having a peripheral portion interposed between the mounting flange on the safety housing and the turbine flange; iii) a second solid disc positioned in the relief opening in the turbine flange and in abutting contact with the first solid disc; iv) first bolt means for securing the safety housing mounting flange and the first solid disc to the turbine flange; v) first spring washer means associated with the first bolt means for maintaining the positional relationship between the safety housing and the turbine flange; vi) an annular ring positioned on the first solid disc and above the relief opening in the turbine housing; vii) second bolt means for securing the second solid disc and the annular ring to the first solid disc; and viii) second spring washer means associated with the second bolt means for maintaining the positional relationship among the first solid disc, the second solid disc and the annular ring.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While this specification concludes with claims particularly pointing out and distinctly claiming the subject matter of the invention, it is believed the invention will be better understood from the accompanying drawings wherein:

DESCRIPTION OF THE PREFERRED EMBODIMENTS

Figure 1:
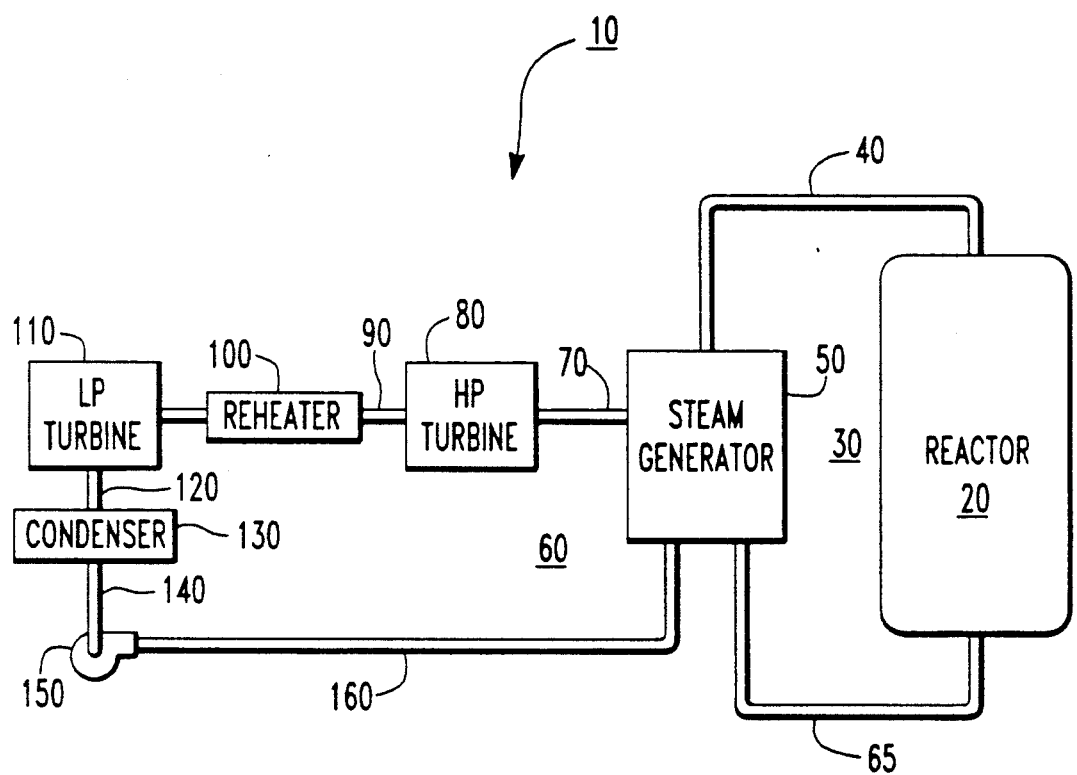
FIG. 1 is a schematic diagram of a portion of a nuclear power plant facility.

In the following description, like reference characters designate like or corresponding parts through-out the several views of the drawings. Also in the following description, it is to be understood that such terms as "forward", "rearward", "left", "right", "upwardly", "downwardly", and the like, are words of convenience and are not to be construed as limiting terms.

Referring now to the drawings, FIG. 1 depicts a portion of a nuclear plant facility, such as a pressurized water nuclear reactor 10 containing a reactor, generally referred to as 20, for generating heat for the production of useful work. Typically, a primary coolant such as boronated water within the reactor 20 controls the nuclear reaction process and conveys heat generated by the reaction process away from the reactor 20. The primary coolant within the reactor 20 flows through a portion of a closed primary loop 30. In particular, the primary coolant flows out of the reactor 20 through a pipe 40 referred to in the industry as a "hot leg". The coolant enters a steam generator 50 where the primary coolant transfers heat absorbed within the reactor 20 to a water-filled secondary system generally referred to as 60. Water within the secondary system 60 is converted to steam through this heat transfer process and is conveyed in succession to a pair of turbines 80, 110. In the primary loop 30, the primary coolant exits the steam generator 50 via a pipe 65, generally referred to as a "cold leg", and returns to the reactor 20 to repeat the above described primary loop cycle.

With respect to the secondary system 60, the steam within the secondary system 60 is isolated from the primary coolant and exits the steam generator 50 via steam line 70 and is conveyed to an energy utilization device such as a high pressure steam turbine 80 (HP turbine). Once entering the HP turbine 80, the steam turns a series of rows of HP turbine blades mounted on a common shaft. The shaft is connected with an electrical generator (not shown) operable to produce electricity. The steam exits the HP turbine 80 via a pipe 90 and enters a reheater 100 which reheats the steam. The steam exits the reheater 100 and flows into a low pressure steam turbine 110 (LP turbine). Once entering the LP turbine 110, the steam turns a series of rows of LP turbine blades mounted on a common shaft. The shaft is connected with an electrical generator (not shown) operable to produce electricity. The steam exits the LP turbine 110 via a pipe 120 into a condenser 130. Once in the condenser 130, the steam is condensed back to water and is conveyed through a pipe 140 to a pump 150 each pumps the water through a pipe 160 back to the steam generator 50 to repeat the above described secondary loop 60 cycle.

Figure 2:
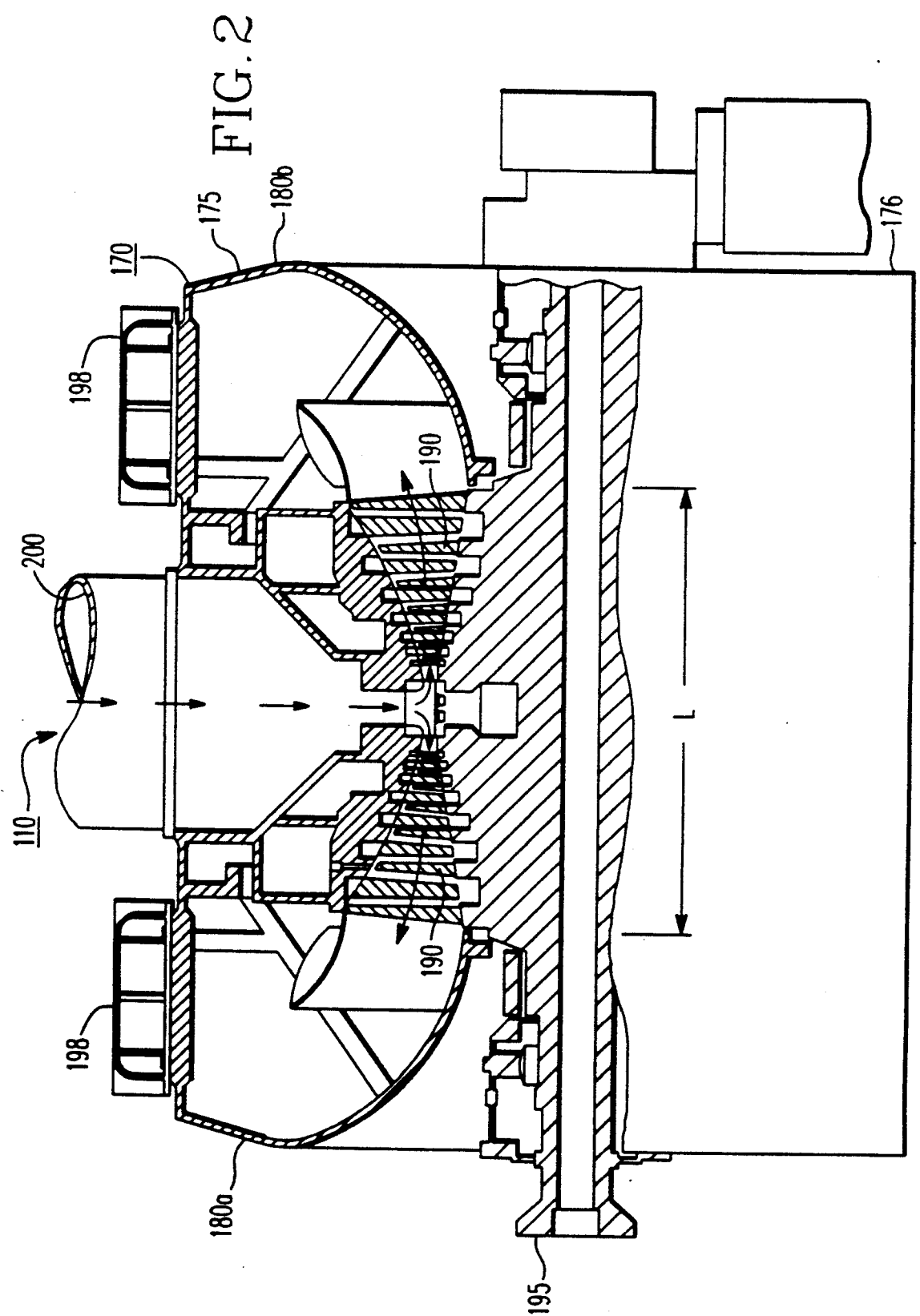
FIG. 2 is a side elevational view, partially in section, of a steam turbine, with portions deleted for clarity, illustrating a steam turbine shaft and plurality of rows of blades mounted thereon, a housing surrounding the shaft and a pair of pressure relief diaphragms mounted atop the housing.

Referring to FIG. 2, the LP turbine 110 includes a generally cylindrical housing 170 having an upper portion 175 and a lower portion 176 enclosed on both ends by conically shaped sides 180a and 180b. The turbine housing 170 encloses a plurality of rows of blades 190 disposed along the length L of a shaft 195 also positioned within the housing 170. The housing 170 has a vacuum under normal operating conditions. Two pressure relief diaphragms 198 are mounted atop and on opposite ends of the housing 170 upper portion 175. As will be described herein in greater detail, the pair of pressure relief diaphragms 198 are operable to release excess pressure within the housing 170 when required, and have a construction which prevents air from leaking into the turbine housing 170 during turbine operation. When the LP turbine 110 is operational, steam enters the LP turbine 110 through a steam inlet pipe 200 communicating with the housing upper portion 175. The steam flows bi-directionally between the plurality of rows of blades 190 forcing the blades 190 and thus the shaft 195 to rotate. The shaft 195 is connected to a generator (not shown) wherein the mechanical energy created by rotation of the shaft is converted to electrical energy. After flowing between the plurality of rows of blades, the steam is discharged from the housing 170 and into the condenser 130 illustrated in FIG. 1.

Figure 3A:
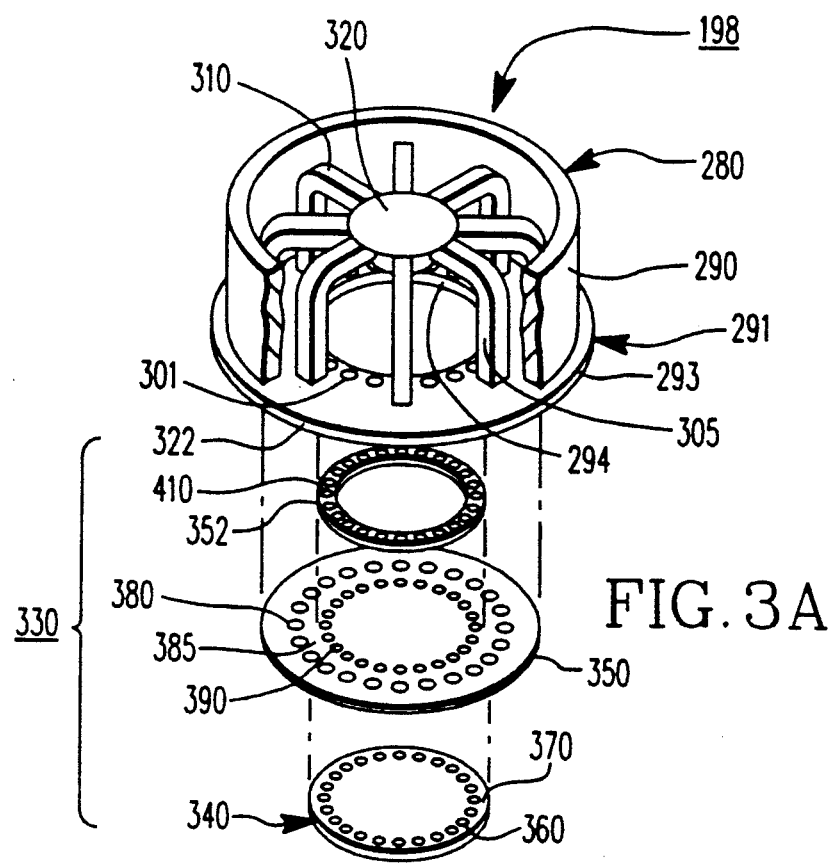
FIG. 3A is an exploded view of the turbine relief diaphragm.
Figure 3:
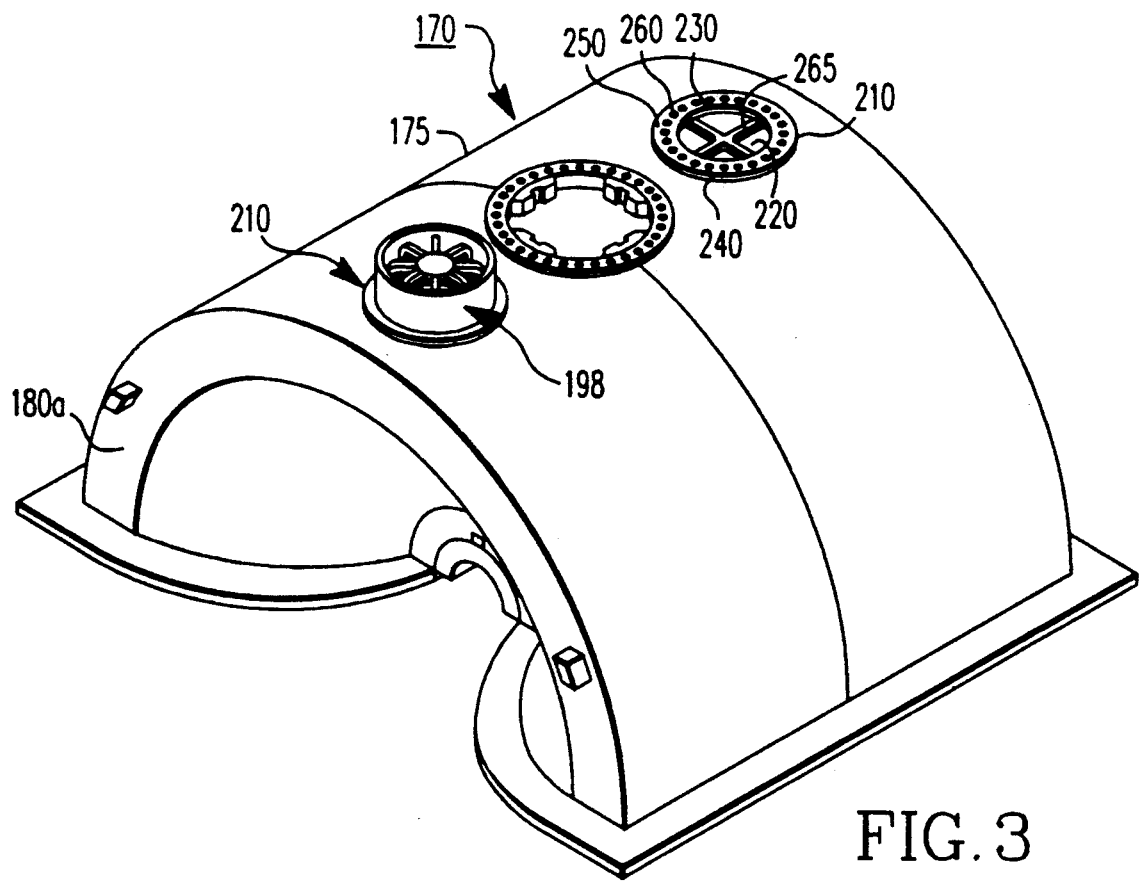
FIG. 3 is a perspective view of a portion of the turbine housing, illustrating a pressure relief diaphragm mounted atop the housing and a turbine flange also mounted atop the housing and adapted to receive a pressure relief diaphragm.

Referring to FIG. 3, the turbine housing 170 upper portion 175 is shown including two circular flanges 210 extending outwardly from the housing upper portion 175. The flanges 210 each provide a means for attaching the pressure relief diaphragms 198 to the turbine housing 170. Each circular flange 210 surrounds a relief opening 220 which allows access to the interior of the turbine housing 170. Each flange 210 includes an inner surface 230, an outer surface 240 and a seating surface 250 extending therebetween. Each flange 210 includes a plurality of spaced apart openings 260 positioned in a circular pattern and used to secure a pressure relief diaphragm 198 to the turbine housing upper portion 175. A cross bar assembly 265 is positioned in the relief opening 220 so that the radial ends of each cross bar assembly 265 abut the inner surface 230 of a flange 210. The cross bar assembly 265 functions as a safety net to prevent a portion of the pressure relief diaphragm 198 from falling into the relief opening 220 should the pressure relief diaphragm fail. Although not shown in FIG. 3, a cross bar assembly 265 is positioned in each of the relief openings in the turbine housing upper portion 175.

Now referring to FIG. 3A, there is illustrated an exploded view of the pressure relief diaphragm 198. The pressure relief diaphragm 198 includes a safety housing 280 which has a generally bird cage-shaped configuration. The safety housing 280 includes a generally circular outside wall 290 extending upwardly from an annular mounting flange 291. The annular mounting flange 291 has an outer edge 293, an inner edge 294 and includes a plurality of circular openings 301 spaced in circular fashion around the flange 291 adjacent to the flanges' inner edge 294. A plurality of rectangularly shaped bars 305 are spaced inwardly from the wall 290 and extend upwardly from the mounting flange 291. The upper portions 310 of the bars 305 are curved and are connected to a circular plate-like disc 320.

The pressure relief diaphragm 198 also includes a double layer plate assembly 330. The plate assembly 330 is formed from a generally circular, solid disc 340, preferably made of carbon steel, a generally circular frangible lead disc 350 and an annular ring 352. The solid disc 340 functions to support the frangible lead disc 350 during operation due to the differential pressure between the interior and the exterior of the housing 170. The disc 340 includes a plurality of circular openings 360 therethrough spaced circumferentially around its peripheral outer edge 370. The frangible lead disc 350 includes a first plurality of circular openings 380 therethrough spaced circumferentially around its peripheral outer edge 385 and a second plurality of circular openings 390 spaced in circular fashion inside the first plurality of openings 380. The annular ring 352 includes a plurality of circular openings 410 therethrough. The openings 410 in the annular ring 352 are in registry with the second plurality of openings 390 in the lead disc 350 and the plurality of threaded openings 360 in the disc 340. With this arrangement, the annular ring 352, lead disc 350 and disc 340 may be bolted together to form the double layer plate assembly 330. In addition, the plurality of circular openings 301 in the safety housing 280 mounting flange 291 are in registry with the first plurality of openings 380 in the lead disc 350 and the plurality of threaded openings 260 in the flange 210. As will be explained with reference to FIG. 4, this arrangement allows the double layer plate assembly 330 to be secured to the circular flange 210 on the turbine housing upper portion 175 when the safety housing 280 is bolted to the flange 210.

Figure 4:
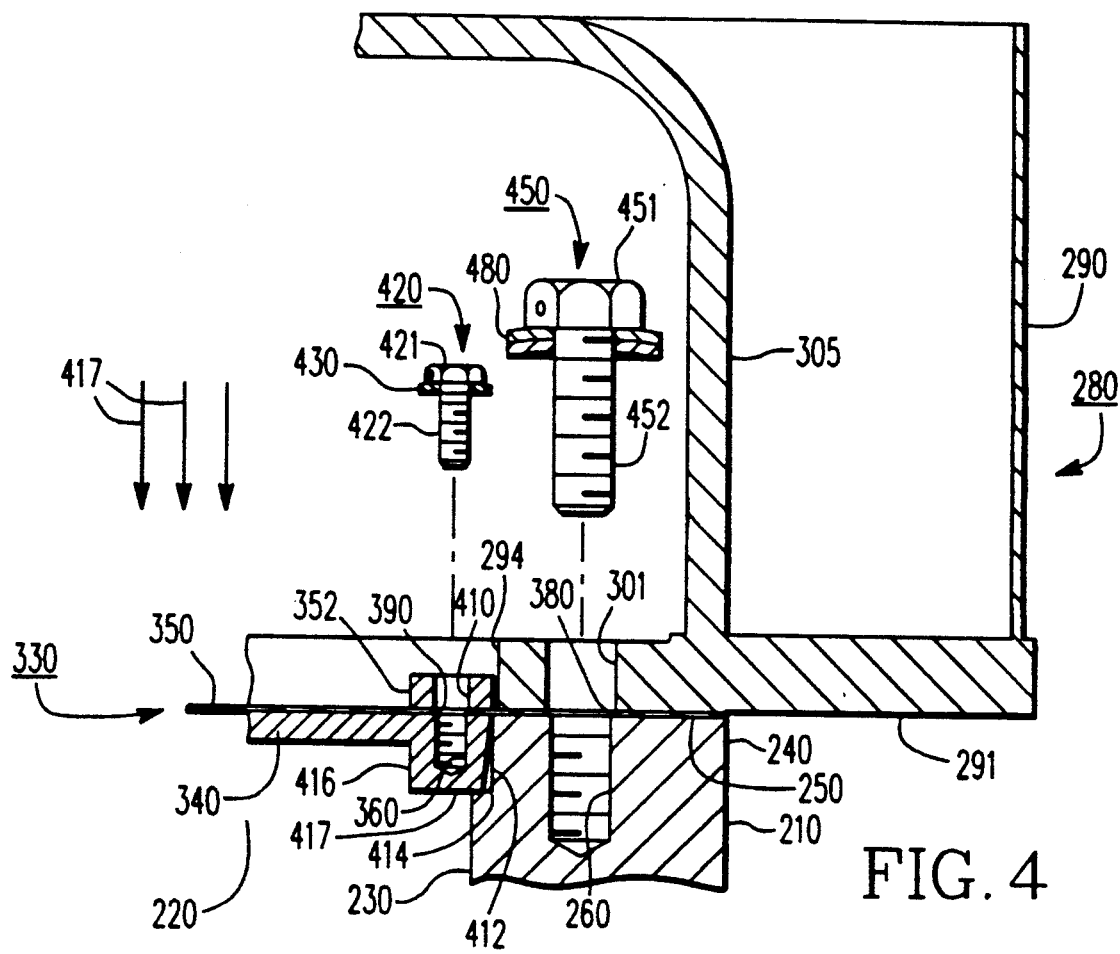
FIG. 4 is a sectional view in side elevation of a portion of a pressure relief diaphragm.

Now referring to FIG. 4, the flange 210 mounted in surrounding relation with the relief opening 220 in the turbine housing upper portion 175 includes a lip portion 412 formed in the flanges'inner wall 230. The lip portion 412 defines a shelf 414 for supporting the solid disc 340 and thus the double plate assembly 330 upon assembly. The solid disc 340 is supported by the shelf 414 since the disc 340 includes an enlarged peripheral edge portion 416 substantially conforming to the shape of the lip portion 412 and having a bottom face 417 arranged to abut the shelf 414.

To secure the diaphragm 198 to the turbine flange 210, the double plate assembly 330 must first be assembled. The double plate assembly 330 is assembled as follows. The openings 410 in the annular ring 352 are positioned in registry with the second plurality of openings 390 in the lead disc 350 and the threaded openings 360 in the disc 340. The elongated draft 422 of a bolt 420 is inserted through each of the plurality of openings 410 and 390, and into threaded engagement with the threaded opening 360. Each bolt 420 is tightened until a spring washer 430 positioned on the elongated shaft 422 and adjacent the bolt head 421 is compressed. The spring washer 430 is operable for maintenance of bolt 420 tension during turbine operation.

After the double plate assembly 330 is assembled, it is positioned on the turbine flange 210 so that the peripheral outer edge 385 of the lead disc 350 is supported by the surface 250 of the flange 210 and the first plurality of openings 380 in the lead disc 350 are in registry with the plurality of openings 260 in the flange 210. The safety housing 280 is positioned on the peripheral outer edge 385 of the lead disc 350 so that the plurality of openings 301 in the safety housing 280 mounting flange 291 are in registry with the plurality of openings 380 and the plurality of threaded opening 260. The elongated shaft 452 of a bolt 450 is inserted through each of the plurality of opening 301 and 380, and into threaded engagement with the threaded opening 260. Each bolt 450 is tightened until a pair of spring washers 480 positioned on the elongated shaft 452 and adjacent the bolt head 451 are compressed. The pair of spring washers 480 are operable for maintenance of bolt 450 tension during turbine operation.

If the pressure within the interior of the housing 170 exceeds five pounds gage over atmospheric pressure, the diaphragm 198 vents this pressure within the housing 170 to the atmosphere to prevent damage to the turbine blades 190 (FIG. 2). To vent the excessive pressure within the housing 170, the pressure forces the solid disc 340 upwardly towards the safety housing 280. The mounting flange 291 inner edge 294 functions as a cutting edge for the lead plate 350 shearing the lead plate 350 at the point directly below the inner edge 294. Once the lead plate 350 shears, the solid disc 350 the annular ring 352 and a portion of the lead disc 350 are forced outwardly and into the bird cage shaped safety housing 280 (FIG. 3), uncovering the relief opening 220 so that the excessive pressure is vented to atmosphere.

Figure 5:
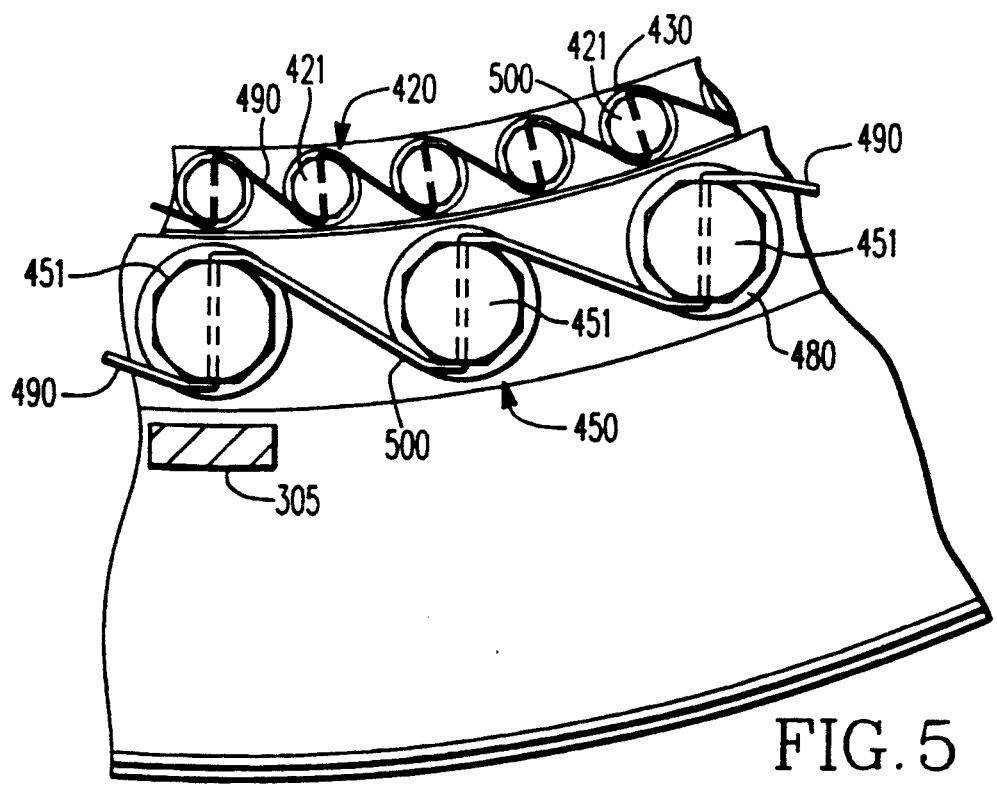
FIG. 5 is a partial top plan view of the turbine pressure relief diaphragm.

Now referring to FIG. 5, a locking wire 490 is passed through each bolt head 421 to further prevent loosening of the bolts 420 during turbine operation. The locking wire 490 provides a secondary safety mechanism operable in conjunction with the spring washers 430 to maintain the bolts in a tightened condition. A similar locking wire 500 is also disposed through each bolt head 451 to prevent loosening of the bolts 450.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A steam turbine comprising:
   (a) a turbine housing operable to receive steam and having a relief opening therein surrounded by a turbine flange;
   (b) a shaft positioned within said housing;
   (c) a plurality of rows of blades positioned along the longitudinal length of said shaft and extending radially outwardly therefrom;
   (d) a steam inlet pipe connected with said housing and operable as a conduit to allow the steam entering said housing to pass between said plurality of rows of blades to rotate said shaft; and
   (e) a pressure relief diaphragm associated with said turbine housing and operable to relieve excess pressure within said turbine housing, including;
      i) a safety housing having a mounting flange thereon arranged to mate with said turbine flange so that said safety housing is positioned over the relief opening in said turbine housing;
      ii) a first solid, frangible disc covering said relief opening in said turbine housing and having a peripheral portion interposed between said mounting flange on said safety housing and said turbine flange;
      iii) a second solid disc positioned in the relief opening in said turbine flange in abutting contact with said first solid disc;
      iv) first bolt means for securing said mounting flange on said safety housing to said turbine flange;
      v) first spring washer means associated with said first bolt means for maintaining the positional relationship between said mounting flange on said safety housing and said turbine flange;
      vi) an annular ring positioned on said first solid disc and above the relief opening in said turbine housing;
      vii) second bolt means for securing said second solid disc and said annular ring to said first solid disc; and viii) second spring washer means associated with said second bolt means for maintaining the positional relationship among said first solid disc, said second solid disc and said annular ring.

2. An apparatus as in claim 1 wherein said first disc is soft metal.

3. An apparatus as in claim 2 wherein said soft metal is lead.

4. An apparatus as in claim 3 wherein said second disc is carbon steel.

5. An apparatus as in claim 4 wherein said lead disc shears at a point where said lead disc is adjacent an inner wall of the turbine flange.

6. An apparatus as in claim 5 wherein:
said first bolt means includes a first plurality of bolts each having a head portion and an elongated shaft;
at least two spring washers are positioned on each bolt elongated shaft adjacent to said head portion; and
said lead disc and the mounting flange of said safety housing each have a plurality of openings in registry with each other;
a threaded bolt circle in the turbine housing flange is in registry with the plurality of openings in both said lead disc and the mounting flange of said safety housing; and
a first bolt elongated shaft is inserted through each of the plurality of openings in both the mounting flange of said safety housing and said lead disc and threadedly received in the threaded bolt circle in the flange of said turbine housing for maintaining the turbine flange and said lead disc in positional relationship.

7. An apparatus as in claim 6 wherein:
said second bolt means includes a second plurality of bolts each having a head portion and an elongated shaft; a spring washer is positioned on each bolt elongated shaft adjacent said head portion; and
said annular ring and said lead disc each having a plurality of openings in registry with each other; a threaded bolt circle in said second solid disc in registry with the plurality of openings in both said lead disc and said annular ring; the second bolt shaft inserted through the plurality of openings in both said annular ring and said lead disc and received in the threaded bolt circle of said second solid disc for maintaining the positional relationship of said annular ring, second solid disc and said lead disc.

8. An apparatus as in claim 7 wherein said carbon steel disc includes an enlarged peripheral edge and said turbine flange includes a lip portion formed in the inner wall thereof for receiving said enlarged peripheral edge.

9. An apparatus as in claim 8 wherein said first plurality of bolts receive a locking means for coupling said first plurality of bolts together in order to prevent said first plurality of bolts from loosening.

10. An apparatus as in claim 9 wherein said second plurality of bolts receive a locking means for coupling said second plurality of bolts together in order to prevent said second plurality of bolts from loosening.

11. An apparatus as in claim 9 wherein said locking means is a locking wire and said first plurality of bolts are holed for receiving the locking wire.

12. An apparatus as in claim 10 wherein said locking means is a locking wire and said second plurality of bolts are holed for receiving the locking wire.

* * * * *